United States Patent [19]

Han et al.

[11] 4,304,649

[45] Dec. 8, 1981

[54] SOLUBILIZATION OF LIGNOCELLULOSIC MATERIALS

[75] Inventors: Youn W. Han; Eivind B. Lillehoj, both of New Orleans; Alex Ciegler, Slidell, all of La.

[73] Assignee: The United States of America as represented by the Secretary of Agriculture, Washington, D.C.

[21] Appl. No.: 180,546

[22] Filed: Aug. 25, 1980

[51] Int. Cl.$^3$ ............................ C08B 1/00; C13K 1/02
[52] U.S. Cl. ................................. 204/160.1; 127/37; 435/163; 536/1; 426/635
[58] Field of Search ........................ 127/37; 204/160.1

[56] References Cited

U.S. PATENT DOCUMENTS

| | | | |
|---|---|---|---|
| 3,034,974 | 5/1962 | Lowry | 204/160.1 |
| 3,352,773 | 11/1967 | Schwartz | 204/160.1 |
| 3,489,606 | 1/1970 | Huibers | 204/160.1 X |
| 3,962,054 | 6/1976 | Wattiez | 204/160.1 X |
| 4,000,032 | 12/1976 | Bergstrom | 204/160.1 |

OTHER PUBLICATIONS

Chemical Abstracts, 78:17863s (1973).
Sabri Ergun, Report from the Lawrence Berkeley Laboratory, University of California entitled "Biomass Liquefaction Efforts in the United States", Feb. 1980.
A. E. Humphrey, "The Hydrolysis of Cellulosic Materials to Useful Products", appearing in Advances in Chemistry Series 181, pp. 25–53 (1979).
T. K. Ghose et al., "Enzymatic Saccharification of Cellulose in Semi-and Continuously Agitated Systems", appearing in Advances in Chemistry Series 95, pp. 415–446 (1969).
Jerome F. Saeman, Industrial and Engineering Chemistry, 37(1), 43–52 (1945).
Jerome F. Saeman et al., Industrial and Engineering Chemistry, 44(12), 2848–2852 (1952).
W. J. Pigden et al., paper no. 11 presented at Proceedings of the Xth International Grassland Congress, paper entitled, "Physical and Chemical Methods for Increasing the Available Energy Content of Forages", 1966.

*Primary Examiner*—Sidney Marantz
*Attorney, Agent, or Firm*—M. Howard Silverstein; David G. McConnell; Raymond C. Von Bodungen

[57] ABSTRACT

The solubilization of lignocellulosic fibrous material is accomplished by impregnating the selected lignocellulosic material with one of a group of certain swelling agents, allowing a sufficient amount of time until the desired degree of swelling is achieved, then subjecting the swollen fibers to irradiation from a gamma radiation source.

6 Claims, No Drawings

SOLUBILIZATION OF LIGNOCELLULOSIC MATERIALS

BACKGROUND OF THE INVENTION (1) Field of the Invention

This invention relates to the chemical treatment of fibrous lignocellulose-containing material to produce a swelling of the fibers which is correlated with hydrolysis after exposed to gamma radiation.

(2) Description of the Prior Art

The Prior Art teaches that lignocellulosic plant materials consist essentially of about 70% carbohydrate and 30% lignin. Nearly 70% of the carbohydrate is cellulose, the remainder is hemi-cellulose. Thus, about one-half of the dry plant matter is cellulose. On hydrolysis cellulose yields glucose, which can be used for a variety of purposes, including the fermentation to alcohol. Because cellulose is not water-soluble and not readily available for nutrition of man the first step in any process utilizing sugar from cellulose is hydrolysis, or the solubilization of cellulose.

Because of the abundance and urgency of utilizing lignocellulose considerable effort has been made in the past to hydrolyze the cellulose (see report A. E. Humphrey in "Hydrolysis of Cellulose: Mechanisms of Enzymatic and Acid Hydrolysis," in advances in Chemistry Series 181 "The Hydrolysis of Cellulosic Materials to Useful Products", pp 25–53 (1979)). J. Saeman, in Industrial And Engineering Chemistry, Vol. 37, page 43 (1945) reported on the hydrolysis of cellulose by the use of acid. The sugar yield, however, was too low and the sugar produced in the hydrolysis was easily destroyed by the acid and the heat. The use of acid required special acid-resistant materials for the equipment and necessitated the recovery of the acid, both of which complicated the process and increased the costs. Thus, due to economic reasons, commercial practice of acid hydrolysis of cellulose is limited.

Lignocellulose can also be hydrolyzed by the enzyme cellulase. The U.S. Army Natick Research and Development Command and several universities and research institutes have developed processes by which various lignocellulosics are hydrolyzed (see "Enzymatic Saccharification of Cellulose in Semi- and Continuously Agitated Systems," by T. K. Ghose and J. A. Kostick, Advances in Chemistry Series 95: pp 415–446 (1969)). In these processes, unlike acid hydrolysis, the released sugars are not decomposed but the rate of cellulose hydrolysis is extremely slow and often extensive pretreatments are needed. Production of enzyme and glucose are too costly to warrant economical practice at the present time.

Other investigators indicate that lignocellulose can be liquified by thermo-chemical conversions. Sabri Ergun of the Lawrence Berkeley Laboratory, University of California, Berkeley, Calif., published a report entitled "Biomass Liquefaction Efforts in the United States," in February 1980. This process was further improved by Battelle Pacific Northwest Laboratories and Lawrence Berkeley Laboratory of the University of Berkeley, in California. According to this process, lignocellulosic materials are treated under carbon monoxide and high temperature (260° to 360° C.) and high pressure (100 to 250 lbs/sq. in.) and produced two barrels of oil per ton of dry lignocellulosic material. The process is essentially hydrogenation (also called deoxygenation), in which oxygen is abstracted from cellulose by carbon monoxide and steam. Because of uncertain economic and unsolved technical problems this process is still in the experimental stage.

J. F. Saeman, M. A. Millett, and E. J. Lawton, as reported in "Effect of High-Energy Cathode Rays on Cellulose," in Industrial and Engineering Chemistry, Vol. 44, pp 2848–2852 (1952), investigated the possibility of using high-energy cathode rays on cellulose hydrolysis. They found that in order to solubilize cellulose a dosage of $3.3 \times 10^8$ rad was required, and this level was too high to be practical. Any dosage less than that would only cause depolymerization and decomposition of carbohydrate material to an extent correlated to the dosage.

W. J. Pigden, G. I. Prichard, and D. P. Heaney irradiated forage crops with high energy gamma source ($2.7 \times 10^8$ rads) and found the digestibility of mature forage material increased. This was reported in "Physical and Chemical Methods for Increasing the Available Energy Content of Forages," Proceedings of the Xth International Grassland Congress, Paper No. 11 (1966). There are many other reports on gamma irradiation of lignocellulosic materials. All indicated that irradiation could improve the digestibility of lignocellulosic material but the dosage would be too high to solubilize cellulose. Thus, solubilization of lignocellulosic material by irradiation has not been considered economically feasible, and the art has not advanced.

SUMMARY OF THE INVENTION

Lignocellulosic fibrous materials, the by-products of various industries, generally discarded as useless, are here utilized in a process which consists of subjecting the fibrous material to a swelling, and once it is in the swollen state, subjected to irradiation from a gamma radiation source. This treatment yields a brownish, viscous, solid material, which is very soluble in water and can be utilized as a starting material for the preparation of alcohols and other chemical substances.

The lignocellulosic fibrous material is generally treated with three parts (weight to volume) of certain alkaline substances, acidifying agents, or other salts. Having achieved the suitable quantity of swelling the fibrous material is then irradiated with gamma radiation, thus rendering the material soluble or solubilizable in water.

DESCRIPTION OF THE PREFERRED EMBODIMENTS

In the preferred embodiments of the solubilization of lignocellulosic fibrous materials by the process of the present invention special consideration has been given to the materials which can be useful in the production of carbohydrates for the fermentation industry, and various aliphatic, aromatic, and cyclic compounds which may be useful as chemical feedstocks for the petrochemical and related industries.

With reference to the lignocellulosic fibrous material that is used with the process of the present invention the preliminary investigative efforts indicate that bagasse, cotton lint and linters, cottonseed hulls, peanut hulls, wood pulp, sawdust, newspaper, cardboard, straws from rice, wheat, oats, barley, millet, and corn-stover, as well as manures from cows and horses, can be utilized. Also, agricultural materials such as kudzu, kenaf, and water hyacinths specifically grown for the process can be included with the lignocellulosics of the invention. The fibrous or woody material may or may not be cut, chopped, ground, milled, or macerated or compressed prior to treatment.

With reference to the preferred swelling agents it should be pointed out that to the selected lignocellulosic fibrous material an aqueous solution ranging from as little as 0.05% to as much as 85%, based on the weight of the substance to be treated, can be added. The preferred list of swelling agents—but not limited thereto—is as follows: alkalies, such as for example sodium hydroxide, potassium hydroxide, lithium hydroxide, and ammonium hydroxide or compounds such as zinc chloride, ethylene diamine, calcium carbonate, sodium carbonate, sulfuric acid, phosphoric acid, and benzyl trimethylammonium sulfate.

In the preferred embodiments the lignocellulosic material is permitted to be in contact with the swelling agent for periods of time ranging from a few seconds to about 60 minutes. Heat may or may not be applied but the reaction normally proceeds at ambient temperatures. The treated lignocellulosic is then exposed to irradiation from a gamma radiation source until an exposure of about from $10^5$ to $10^9$ rads is achieved. The gamma irradiation may be from any of several sources; however, the preferred source includes Cobalt 60 and Cessium 137. The latter gamma source is generally available from the nuclear reactor industry as a waste.

The lignocellulosic fibrous material may be exposed to the gamma irradiation via a batch process or continuously, as on a moving belt, for example. The solubilized or partially solubilized lignocellulosics may be recovered and subjected to further treatment based on intended use.

ADVANTAGES AND OTHER OBSERVATIONS PERTAINING TO THE NEW PROCESS

Even though cellulose hydrolysis by high energy cathode ray has been known in the past, the level of dosage required to solubilize cellulose was too high ($3.3 \times 10^8$ rad) for practical use. By proper combination of chemical pretreatment and irradiation the dosage level required to solubilize cellulose to almost 10 fold could be reduced. Also, the use of Cessium 137 that is a nuclear waste material currently, makes the process more practical, compared to previous method of using high energy cathode ray or gamma ray from Cobalt 60.

Unlike the conventional acid and enzymatic hydrolysis, the process of the present invention does not require a large volume of water, elaborate controls, or expensive product recovery procedures. The irradiated materials are in the form of liquid or thick paste which can be diluted to a solution of any desired sugar concentration. This is a reverse operation of conventional methods in which dilute sugar solution is first obtained and then concentrated to a desired level. Furthermore, the sugar solution produced by this method is sterile and ready to use for fermentation or other aseptic processes. Thus, the cost for sterilizing large quantities of fermentation broth can be eliminated.

By the process of the present invention, besides cellulose and hemi-cellulose, the lignin portion of plant material is also solubilized; thus, separation and utilization of lignin and lignin degradation products become easy.

DEFINITIONS

A gamma ray is one of short wavelength electromagnetic radiation of nuclear origin with a range of wavelengths about from $10^{-8}$ to $10^{-11}$ centimeter, emitted from the nucleus.

The rad is a measure of the energy imparted to matter by ionizing radiation per unit mass of irradiated material. It is defined specifically as 100 ergs per gram in any medium. To calculate a dosage imparted to a treated material one multiplies the amount of gamma irradiation emitted by an irradiating source, such as, for example, cobalt or cessium, in a unit of time, such as rads per minute, times the total time of exposure. A megarad (Mrad) is simply one million rads, or $10^6$ rads.

The following examples are provided to illustrate certain aspects of the present invention and are not meant to limit the invention in any manner whatsoever.

EXAMPLE 1

Sun-dried sugarcane bagasse was ground, to pass a ½ inch screen. It was then mixed with 2 parts (w/v) of 17% sodium hydroxide. This mixture was divided into a number of equal portions which were then put into plastic containers and subjected to gamma irradiation. Samples were removed after receiving dosages ranging from 50 Mrad to 300 Mrad. The irradiation was performed in a gamma cell (Cobalt 60) that was housed under water; this cell produced a dose of approximately 2500 rads per minute (see R. L. Calleton, E. Choong, and R. C. McIbemy, in Wood Science and Technology, Vol. 4, page 225 (1970)). After completion of irradiation each sample was tested for physical appearance, sugar yield, and degree of dry matter solubilization.

The treated samples were dissolved in water (10%, w/v) and the total amount of sugar in each of the aqueous portions was determined by the phenol sulfuric acid method (Montgomery, R 1961; Biochem. Biophys. Acta. 48:591). The amount of reducing sugar was determined in each case by the dinitrosalicylic acid method (Pettersson, G., and J. Poath (1966) "A Cellulolytic Enzyme from Penicillium Notatum," Methods Enzymol. 8:603–607). The degree of dry matter digestion was determined by the amount of residue after filtration through Wattman filter paper No. 1.

The effect of gamma radiation on cellulose was readily perceived. High dosages—such as $10^7$–$10^8$ rads, for example—produced pungent odor and loss of physical firmness of the fiber. The effect was particularly apparent when the sample was pretreated with sodium hydroxide. The sample treated with 17% sodium hydroxide and irradiated with 100 Mrads had completely lost the physical integrity of the fiber and formed a dark brownish paste or liquid, depending upon the amount of the liquid used. As Table I shows, the sample treated with 17% NaOH and irradiated to 100 Mrads was 79% water soluble and contained 46% total sugar. The composition of sugar was 78% trisaccharides and above, 16% disaccharides, and 6% monosaccharides. The untreated control was only 7.2% water soluble and had 0.4% total sugar. The sample that was not treated with NaOH but irradiated to 100 Mrads solubilized a considerable amount (31.2%) of dry matter but produced little soluble sugar (3.6).

TABLE I

DEGREE OF SOLUBILIZATION AND SUGAR PRODUCTION BY IRRADIATION OF SUGARCANE AND BAGASSE WITH COBALT 60

| Pretreatment | Dosage (rads) | Solubility in H$_2$O (% dry matter) | Sugar Content (% dry matter |
|---|---|---|---|
| None | 0 | 7.2 | 0.4 |

TABLE I-continued

DEGREE OF SOLUBILIZATION AND SUGAR
PRODUCTION BY IRRADIATION OF
SUGARCANE AND BAGASSE WITH COBALT 60

| Pretreatment | Dosage (rads) | Solubility in H$_2$O (% dry matter) | Sugar Content (% dry matter) |
|---|---|---|---|
| None | $10^8$ | 31.2 | 3.6 |
| 17% NaOH | $10^8$ | 79.1 | 46.0 |
| 4% NaOH and washed | $3 \times 10^8$ | 67.0 | 36.0 |

EXAMPLE 2

An alternative procedure consisted of treating the sugarcane bagasse with 4% sodium hydroxide (2.3 Kg bagasse in 40 liters of NaOH solution), boiling for one hour, and washing until a neutral pH was obtained; this treatment removed most of the hemicellulose (42% of dry matter). The hemicellulose-free bagasse was then subjected to gamma radiation at a dosage of 300 Mrads. The treated sample had the original yellowish brown color of sugarcane bagasse and was readily soluble in water. The sample was 67% water soluble and contained 36% total sugar.

EXAMPLE 3

Ten kilograms (10 kg) of dry sugarcane bagasse was mixed with 30 liters of 17% sodium hydroxide, divided into three equal portions, and placed in plastic bags. The samples were irradiated with Cessium 137, the first for 19 hours, the second for 42 hours, and the third for 65 hours. The radiation dosage received by these samples was 24.5, 54.2, and 84.7 Mrads, respectively. The irradiation facility was the solid irradiator developed by Marvin Morris, Jim D. Pierce, and Willis J. Whitfield, and the details of the apparatus are thoroughly presented in U.S. Pat. No. 4,151,419. Upon completion of irradiation of these samples the individual samples were immediately neutralized with a 4 N H$_2$SO$_4$ solution and placed in frozen storage until sugar analysis was performed. As Table II shows, the sample irradiated to 24.5 Mrads was 61% soluble and contained 45% total sugar, whereas the sample irradiated with 54.2 Mrads was 91% soluble and contained 60% total sugar. The sample irradiated to 84.7 Mrads was found to be completely soluble.

TABLE II

DEGREE OF SOLUBILIZATION AND SUGAR
PRODUCTION BY IRRADIATION OF
SUGARCANE BAGASSE WITH CESSIUM 137

| Treatment | Solubilization % | Sugar (% dry matter) | |
|---|---|---|---|
| | | Total sugar | Reducing sugar |
| 24.5 Mrads | 61.0 | 45.0 | 5.0 |
| 54.2 Mrads | 91.0 | 60.0 | 7.5 |
| 84.7 Mrads | 100.0 | — | — |

We claim:
1. A process for converting fibrous lignocellulosic materials to soluble and solubilizable substances useful in the preparation of carbohydrates and complex organic feedstocks comprising:
  (a) wetting the selected lignocellulosic fibrous material with a solution containing a swelling agent for the lignocellulosic fibrous material,
  (b) allowing the resulting wet material of (a) sufficient time to swell, and
  (c) exposing the swollen fibrous material to gamma irradiation to obtain a soluble or solubilizable material, the exposure time to the irradiation being a function of the starting material, the swelling agent and the selected irradiation dosage.

2. The process of claim 1 wherein the lignocellulosic fibrous material is selected from the group consisting of
woody waste,
agricultural waste,
herbaceous plants,
municipal waste, and
animal manures.

3. The process of claim 1 wherein the swelling agent is selected from the group consisting of
sodium hydroxide,
potassium hydroxide,
lithium hydroxide,
ammonium hydroxide,
benzyl trimethylammonium sulfate,
zinc chloride,
calcium carbonate,
sodium carbonate,
sulfur dioxide,
sulphuric acid, and
phosphoric acid.

4. The process of claim 1 wherein the time allowed for the lignocellulosic fibers to swell varies about from 1 to 60 minutes, depending on the lignocellulosic material and the swelling agent required.

5. The process of claim 1 wherein the source of said irradiation is either Cobalt 60 or Cessium 137.

6. The process of claim 1 wherein the duration of the exposure to the gamma irradiation results in a dose of about from $10^5$ to $10^9$ rads.

* * * * *